_United States Patent Office_

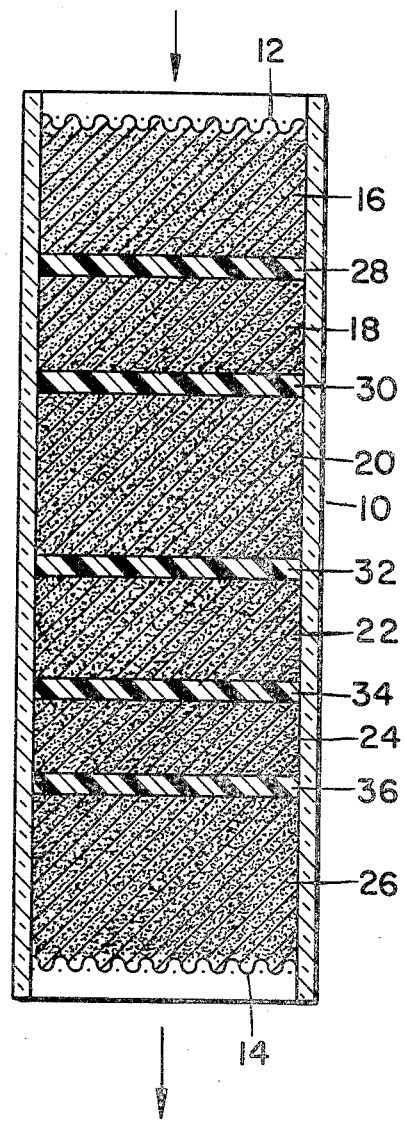

3,497,069
Patented Feb. 24, 1970

3,497,069
APPARATUS FOR WATER PURIFICATION BY ION EXCHANGE
James R. Lindenthal, Horseheads, N.Y., and Richard H. Winn, Newburyport, Mass., assignors to Corning Glass Works, Corning, N.Y., a corporation of New York
Filed Nov. 1, 1968, Ser. No. 772,707
Int. Cl. B01d *15/04, 23/02*
U.S. Cl. 210—282                                                        4 Claims

ABSTRACT OF THE DISCLOSURE

A method and apparatus for removing impurities from water in large quantities in which the water is passed successively through layers of a strong acid cation exchange resin, a weakly basic anion exchange resin, a second layer of strong acid cation exchange resin, a second layer of weakly basic anion exchange resin, a strongly basic anion exchange resin and lastly through a layer comprising a mixture of strong acid cation exchange resin and strongly basic anion exchange resin.

BACKGROUND OF THE INVENTION

The purification of water by its passage through cation exchange materials and anion exchange materials in order to remove the respective ions is well known. An example of such a process is described in U.S. Patent 2,525,497. Such processes are very effective; however, for certain applications, such as the preparation of reagent solutions, where water of extremely high purity, sometimes exceeding that of distilled water, is required and where deionizers having high capacities are desirable, past arrangements of such materials have not been entirely satisfactory.

It is an object of the present invention to provide a method and apparatus wherein water of extremely high purity can be produced in large quantities by contacting the water by a plurality of differing ion exchange materials in a particular sequence.

SUMMARY OF THE INVENTION

The present invention involves the discovery that when water is treated in a particular sequence by a plurality of well-known ion exchange materials large quantities of very pure water are available. In particular, highly effective purification can be obtained by subjecting the water in sequence to at least three separate treatments. The water is brought successively into contact with a strong acid cation exchange material, a weakly basic anion exchange material, and a mixture of strong acid cation exchange material. In its preferred embodiment, the invention contemplates bringing the water into contact with strong acid cation material and a weakly basic anion material for a second time and a strongly basic anion exchange material in that order, immediately before contact with the mixture of materials.

BRIEF DESCRIPTION OF THE DRAWING

The drawing is a cross-sectional view through a bed of ion exchange materials illustrative of the preferred embodiment of the invention.

DESCRIPTION OF THE PREFERRED EMBODIMENT

Referring to the drawing, the apparatus of the invention comprises a tubular glass container 10 having a plurality of layers of ion exchange material contained therein by means of foraminous end plates 12 and 14 which permit the flow of water into the ion exchange bed through plate 12 and out of the bed through plate 14, as indicated by the arrows.

Immediately upon entering the bed, water passes through layer 16 formed of a strong acid cation exchange resin, such as Rohm & Haas Amberlite IR-120 resin in hydrogen form. This layer removes dissolved cations and converts dissolved salts to their corresponding acids. The reaction can be illustrated by the equation

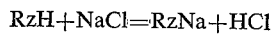
$$RzH + NaCl = RzNa + HCl$$

where RzH represents the ion exchange resin.

Layer 16 is separated from layer 18 by polyurethane foam separator 28. This separator, through which water can easily pass but through which the particles of the ion exchange resin cannot pass, is compressed to approximately 1/8 of its original thickness after it is inserted in the container. The separator not only prevents mixing of the resins, which has been found to decrease the capacity of the bed, but also, due to its resilience, during the use of the separator expands to fill the space created by shrinkage of the strong acid cation exchange resin resulting from reaction with the impurities in the water. Similarly, the remaining layers of ion exchange resins are separated by separators 30, 32, 34 and 36.

After passing through layer 16 and separator 28, the water passes through a weakly basic anion exchange resin in hydroxide form, such as that designated by Rohm & Haas Company as XE-236. The resulting mineral acidity produced by layer 16 is removed, with the exception of weak acids such as silica and carbon dioxide. The reaction is illustrated by the equation

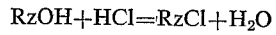
$$RzOH + HCl = RzCl + H_2O$$

where RzOH represents the weakly basic anion exchange resin in hydroxide form.

After passing through layer 18, water passes in succession through layers 20 and 22, which are identical to layers 16 and 18, respectively. These layers treat any leakage which may have resulted from layers 16 and 18.

After passing through layers 16, 18, 20 and 22, the water contains some weak acids which have not contacted an active ion exchange site. These weak acids are removed by passage of the water through layer 24, which is a strongly basic anion exchange resin in the hydroxide form, such as that designated by Diamond Alkali Company as GPA-316. Typical weak acids which are removed by passage through this layer are $CO_2$, $H_2S$, $SiO_2$ and $H_3BO_3$.

Lastly, the water is passed through layer 26, which is a mixture of stoichiometrically equivalent amounts of strongly basic anion exchange resin in the hydroxide form and strong acid cation exchange resin in the hydrogen form, such as that mixture designated by Rohm & Haas Company as Monobed MB-1. This layer removes any impurities not removed by the other layers and greatly contributes to the purity of the emergent water.

For maximum capacity per volume of ion exchange resin the resins of layers 16 and 18 are present in stoichiometrically equivalent amounts. Similarly, the resins of layers 20 and 22 are present in stoichiometrically equivalent amounts. In total, layers 16, 18, 20 and 22 may form between 50 and 90% of the total resin volume of the bed and preferably form 65% of the bed. Layer 24 may form between 2.5 and 20% of the total resin volume and preferably forms 7%. Layer 26 may form between 2.5 and 50% of the total resin volume and preferably forms 28%.

Experimentation has shown that discrete layers each of which contains only one resin type, such as layers 16, 18, 20, 22 and 24, contribute to the total capacity of the bed to remove impurities, while mixtures of resins, such as layer 26, contribute to the degree of purity obtainable. It is for that reason that the present ion exchange bed contains each type of layer.

In its broad aspect the present invention contemplates the use of a bed comprising a strong acid cation exchange material, a weakly basic anion exchange material and a mixed layer of strong acid cation exchange material and strongly basic anion exchange material. An intermediate layer of strongly basic anion exchange material, such as layer 24, although preferable, is not essential. Similarly, a second layer of strong acid cation exchange material and a second layer of weakly basic anion exchange material such as layers 20 and 22 may be omitted. In such case, the thicknesses of the single layers of strong acid cation exchange material and weakly basic anion exchange material should be doubled. Although the omission of these three layers decreases by 10% capacity to produce water having a resistivity above 50,000 ohm-cm., capacity to produce water having a resistivity above 1,000,000 ohm-cm. is increased by 10%. Accordingly, when total capacity is less important than high purity, this arrangement may be used.

In the illustrated ion exchange bed, in which container 10 is in the form of a glass tube having an inner diameter of approximately 3½ inches and in which layers 16, 18, 20, 22, 24 and 26 have thicknesses of 3, 2, 3, 2, 1 and 4¼ inches, respectively, tap water having a hardness of 480 p.p.m. can be purified so as to have a resistivity upon initial use of the bed of over 10,000,000 ohm-cm. A resistivity of 3,000,000 ohm-cm. is obtained after the removal of 22.9 kilograins per cubic foot of resin, a resistivity of 100,000 ohm-cm. is obtained after the removal of 25.4 kilograins per cubic foot of resin and a resistivity of 50,000 ohm-cm. is obtained after the removal of 29.6 kilograins per cubic foot of resin. Typical prior water purifiers have produced water having a resistivity of 50,000 ohm-cm. after the removal of only about 18 kilograins per cubic foot of resin.

It will be appreciated that substitutions may be made for the specific resins designated in reference to the preferred embodiment of the invention. Various anion and cation exchange materials are well known to those skilled in the art and may be substituted for those designated above.

Inasmuch as the foregoing description has been provided solely as that of a preferred embodiment of the invention, it is intended that the scope of the invention be limited only by the scope of the appended claims.

We claim:
1. Means for the removal of impurities from water which means comprises
   an elongated container,
   a foraminous member closing each end of said container, and
   a bed of ion exchange material within said container, said bed comprising in succession progressing from one end of said container:
   a water permeable layer of strong acid cation exchange material,
   a water permeable layer of weakly basic anion exchange material,
   a second water permeable layer of strong acid cation exchange material,
   a second water permeable layer of weakly basic anion exchange material, a water permeable layer of strongly basic exchange material,
   a water permeable layer comprising a mixture of strong acid cation exchange material and strongly basic anion exchange material, and means including a compressible porous material to maintain adjacent layers separated from each other whereby expansion of said porous material will compensate for shrinkage of said layers during use.

2. Means according to claim 1 in which said materials of said first-mentioned layers of strong acid cation exchange material and weakly basic anion exchange material are present in stoichiometrically equivalent amounts and in which said materials of said second layers of strong acid cation exchange material and weakly basic anion exchange material are present in stoichiometrically equivalent amounts.

3. Means according to claim 2 in which said materials of said layer comprising a mixture of strong acid cation exchange material and strongly basic anion exchange material are present in stoichiometrically equivalent amounts.

4. Means according to claim 1 in which said porous material is a polyurethane foam plastic.

References Cited

UNITED STATES PATENTS

| | | | |
|---|---|---|---|
| 3,147,215 | 9/1964 | Blight | 210—38 X |
| 3,184,064 | 5/1965 | Sampson et al. | 210—266 X |
| 3,342,340 | 9/1967 | Shindell | 210—283 X |
| 3,355,018 | 11/1967 | Smith | 210—290 X |

SAMIH N. ZAHARNA, Primary Examiner

U.S. Cl. X.R.

210—37, 38, 283